United States Patent
Mar et al.

(10) Patent No.: US 7,854,686 B2
(45) Date of Patent: Dec. 21, 2010

(54) EXERCISE AND DANCE PLATFORM APPARATUS AND SYSTEMS

(75) Inventors: Kenny Mar, Rosemead, CA (US); Steven Mar, Rosemead, CA (US)

(73) Assignee: Hyperkin Inc., Rosemead, CA (US)

( * ) Notice: Subject to any disclaimer, the term of this patent is extended or adjusted under 35 U.S.C. 154(b) by 0 days.

(21) Appl. No.: 12/718,809

(22) Filed: Mar. 5, 2010

(65) Prior Publication Data

US 2010/0234183 A1    Sep. 16, 2010

Related U.S. Application Data

(60) Provisional application No. 61/158,923, filed on Mar. 10, 2009.

(51) Int. Cl.
*A63B 71/00* (2006.01)
(52) U.S. Cl. ............... 482/8; 482/1; 434/250; 463/36
(58) Field of Classification Search ............... 482/1–9, 482/74, 900–902; 434/247, 250; 463/1, 463/6, 33, 36
See application file for complete search history.

(56) References Cited

U.S. PATENT DOCUMENTS

| | | | | |
|---|---|---|---|---|
| 6,110,073 A | * | 8/2000 | Saur et al. | 482/8 |
| 6,410,835 B2 | * | 6/2002 | Suzuki et al. | 84/464 R |
| 7,122,751 B1 | | 10/2006 | Anderson et al. | |
| 7,361,856 B1 | * | 4/2008 | Anderson | 200/85 R |

* cited by examiner

*Primary Examiner*—Glenn Richman
(74) *Attorney, Agent, or Firm*—Edward C. Schewe

(57) ABSTRACT

A platform or mat for exercising and dancing that is lightweight, has non-slip features and can be folded up for storage. The platform allows a user to determine foot position without having to look down at the platform thus allowing the user to watch a display screen while exercising or dancing. The platform includes tactile indicia molded that foot placement is determined by feel by the user's foot touching the tactile indicia. The material used to make the platform surface includes ethylene vinyl acetate. The platform includes electrically conductive switches that are activated by a force from the user's foot on a segment while exercising or dancing. Placing a user's foot on a segment communicates signals about the user's foot placement to a control device. The control device includes popular video game player devices and computers and includes the use of a display screen.

13 Claims, 7 Drawing Sheets

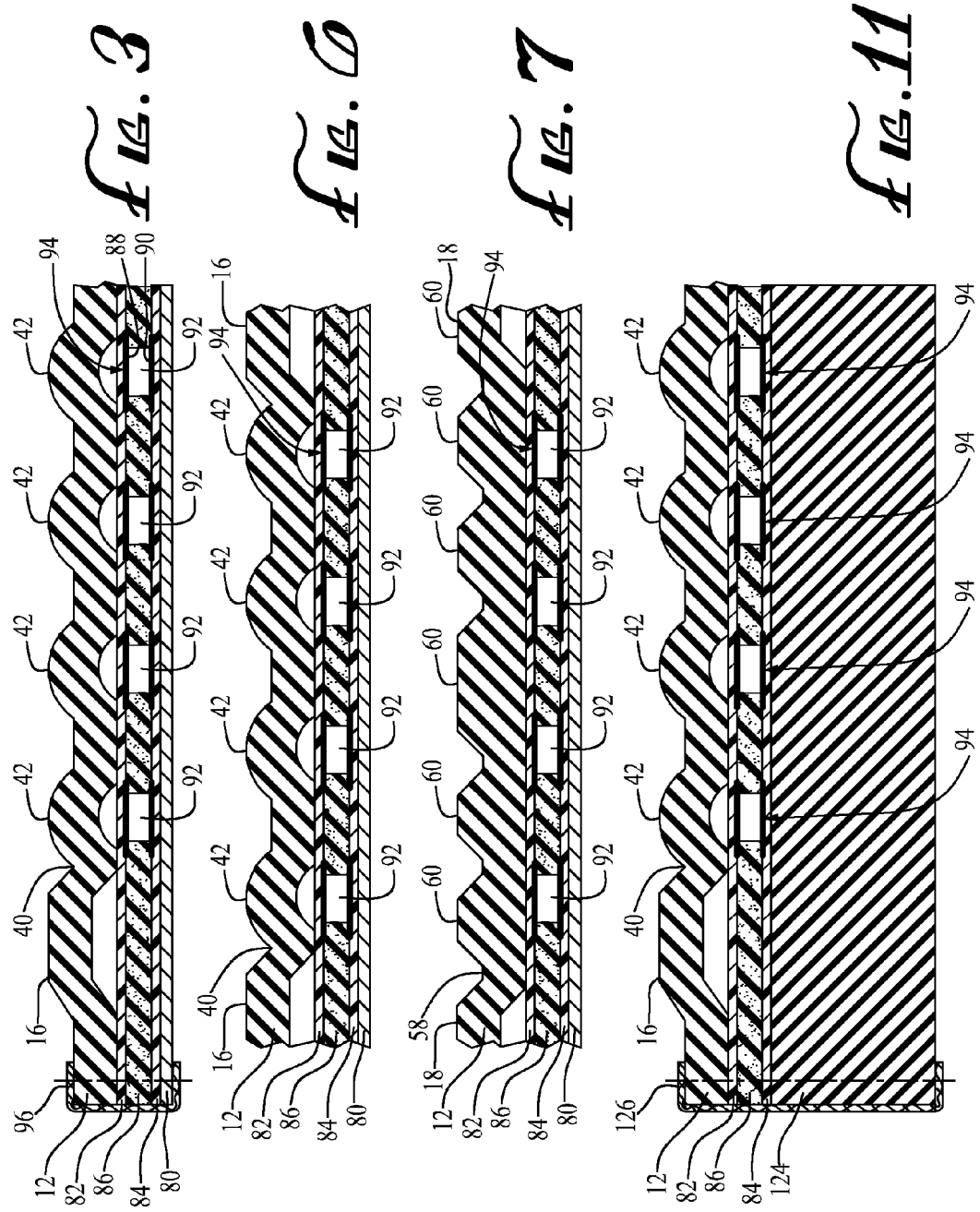

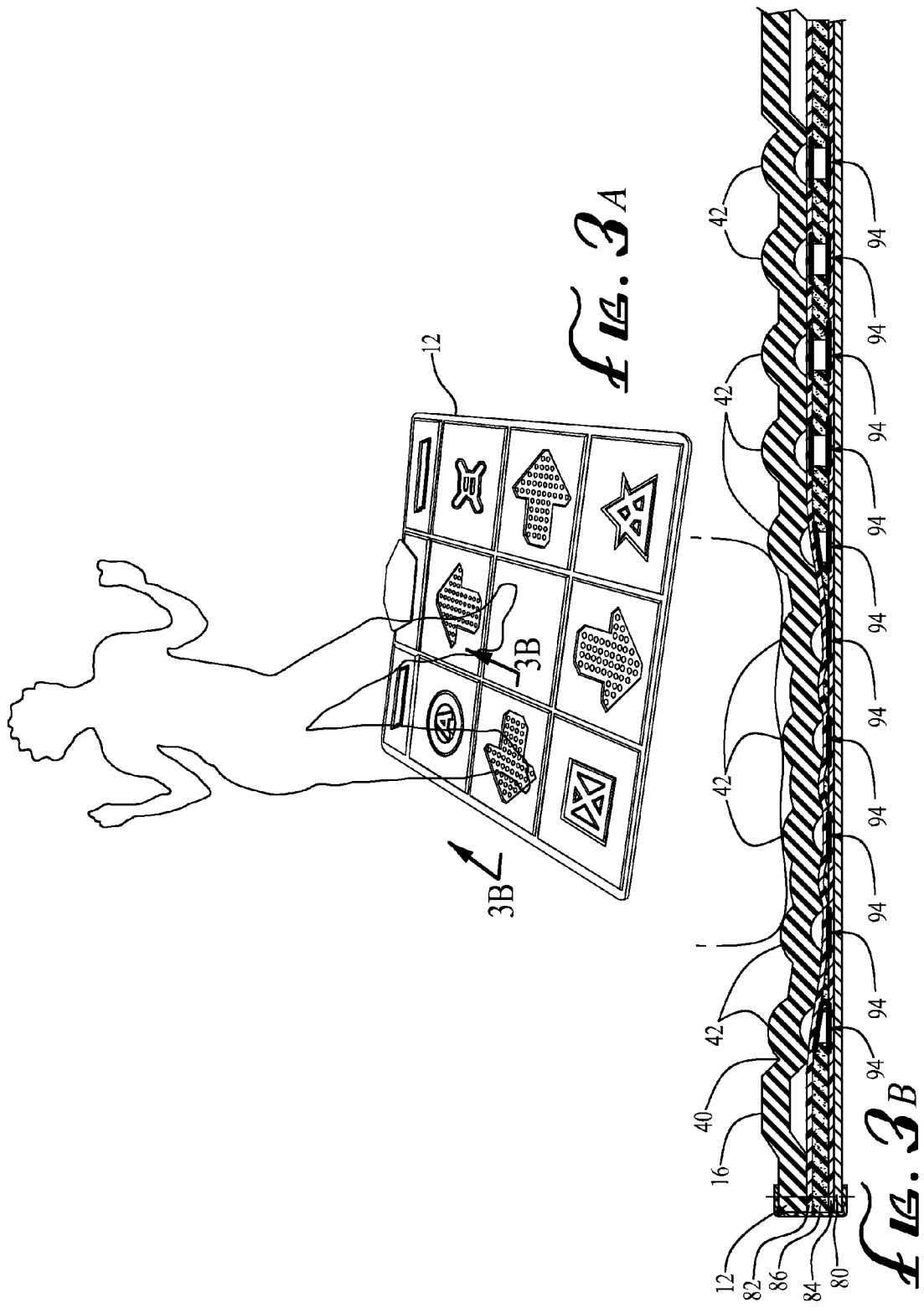

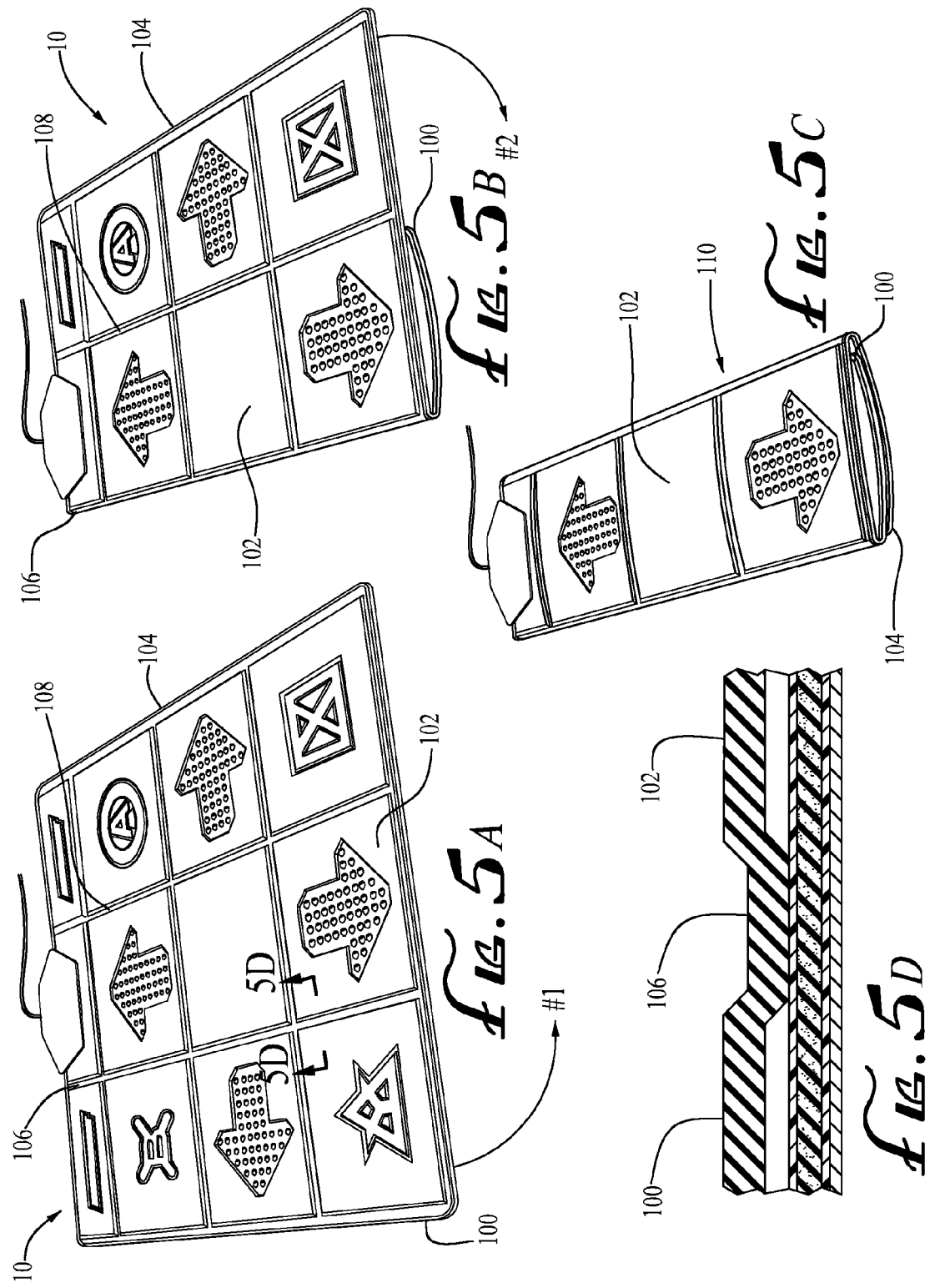

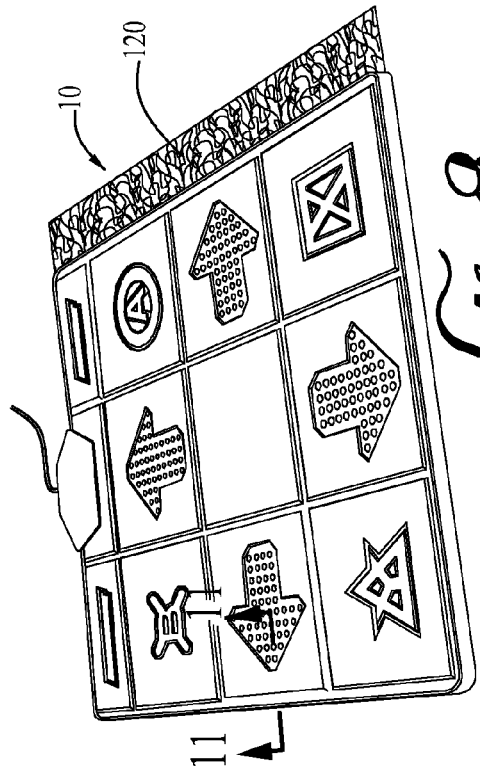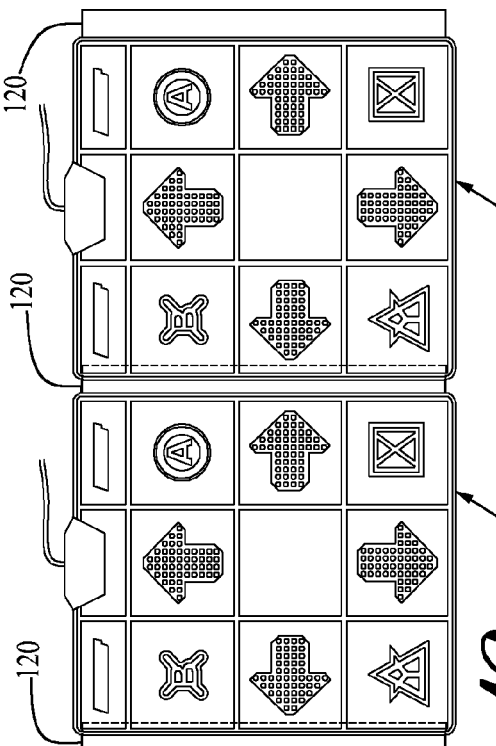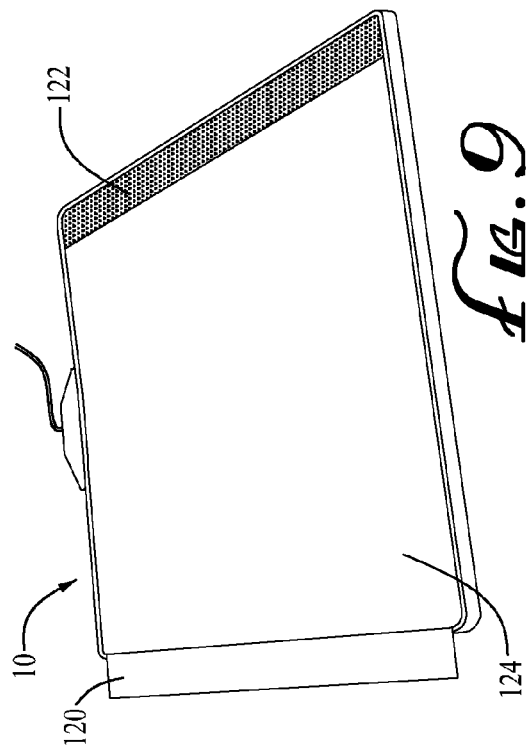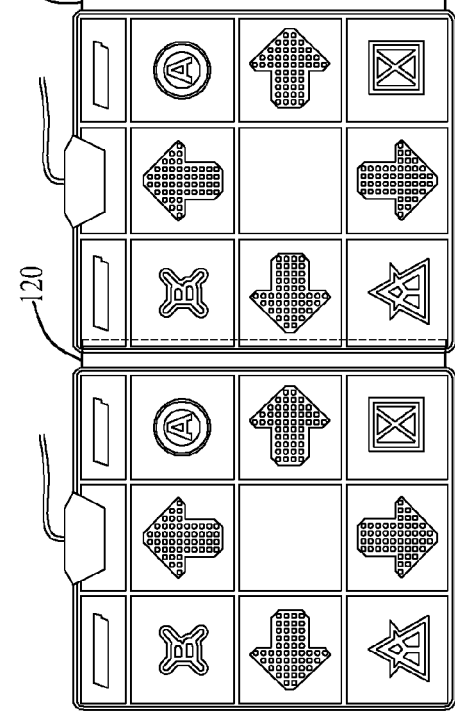

EXERCISE AND DANCE PLATFORM APPARATUS AND SYSTEMS

RELATED APPLICATION DATA

This application claims the benefit of U.S. Provisional Application Ser. No. 61/158,923 filed on Mar. 10, 2009 entitled Exercise and Dance Platform Apparatus and Systems.

BACKGROUND OF THE INVENTION

1. Field of the Invention

The invention relates to exercise and dance platforms, and more particularly, to platforms where users safely and easily determine their position by tactile sensitive groove indicia and also selectively activate switches by foot placement on segments of the platform while exercising or dancing on the platform.

2. Description of the Related Art

Portable dance and exercise mats or platforms have been in use for years. Conventional platforms include two types that may be broadly classified as either rigid or roll-up. Rigid platforms are constructed to maintain a planar shape and to hold their switches in a fixed relative orientation. Such platforms typically have components made from a thin sheet metal and are mounted on a substrate made from wood. Rigid platforms tend to be heavier thereby reducing ease of transportability.

The parts and connections for these rigid platforms wear out over time and often result in a stuck buttons and unreliable operation. An example of a conventional rigid platform that utilizes a wood base and threaded fasteners in its construction is described in U.S. Pat. No. 7,122,751 to Anderson et al.

Roll-up type platforms tend to be light in weight, and by rolling up, can more easily be transported and stored. Roll-up platforms cannot maintain a planar shape under certain user movements and will slip or slide on certain floor surfaces during use possibly causing a user to fall and injure himself or herself. Roll-up platforms wear out more quickly under repeated use and have reliability problems.

A need exists for a platform that overcomes the problems with conventional exercise and dance platforms. A need exists for a platform that is lightweight but also durable and reliable. A need further exists for a platform that is easy to use, includes non-slip surfaces, can be transported easily and stored in a folded up reduced size configuration when not in use and has a connecting structure to allow multiple platforms to be secured together in a side by side configuration so that a number of users can perform as a group.

SUMMARY OF THE INVENTION

A platform for exercising and dancing that is intuitively easy to use, is lightweight, has non-slip features and can be folded up for storage. The inventive platform is durable, reliable and can be assembled without threaded fasteners or bolts.

The platform described herein has the advantage of allowing a user to determine foot position without having to look down at the platform thus allowing the user to watch a display screen while exercising or dancing. The platform includes grooved indicia on segments so that foot placement is determined by feel by the user's foot touching grooved indicia.

The invention includes electrically conductive switches associated with discrete segments on the platform that are normally open. The switches are activated by a force from the user's foot on a segment while exercising or dancing. Placement of a user's foot on a segment also communicates signals about the user's foot placement to a control device. The control device includes popular video game player devices and computers and the invention includes the use of a display screen. For example, the display screen can be used to show whether the user is following a dance or exercise routine. The use of a control device or video display is optional and the invention includes use without a control device or any external stimuli.

In one or more embodiments, the grooved indicia include a plurality of truncated domes within a grooved portion having the configuration of an arrow. In other segments on the platform, the indicia include other symbols with tactile features, including letters or designs within an appropriately shaped grooved portion. The grooved portions and indicia have the added benefit of soothing sore and tired feet of a user and providing a message feature for the feet.

In embodiments of the invention, the platform has a substantially rectangular configuration and is divided into nine segments in addition to Start and Select segments. The platform includes a hub attachment area for connecting cables and associated wiring so that the platform is in communication with the control device.

In alternative embodiments, the platform is made from ethylene vinyl acetate well known to persons skilled in the art. Embodiments of the inventive platform include a non-slip first or upper surface to lessen the chance a user will slip while dancing or exercising on the platform. Further alternative embodiments include a non-slip base to inhibit the platform from undesirably moving or slipping when placed on a floor surface such as carpet or hardwood during use.

Embodiments of the invention include a folding feature for convenient space-saving storage of the platform when not in use. In these embodiments, the platform is folded up along a first fold line, folded up along a second fold line and then carried by a user to a storage space such as a closet or under a bed. These embodiments have the advantage in that the platform will not take up floor space in a recreational room or living room when not in use allowing the floor space to be used for other activities.

The invention includes embodiments with two platforms placed adjacent to each other and embodiments with a series of platforms placed in a side by side relationship and connected together. In these embodiments, a connecting structure secures one platform in position adjacent to another platform. Multiple users can simultaneously exercise or dance on their own platform in a competition or alternatively, a user can have access to two or more of the platforms.

Further advantages and embodiments of the invention will be apparent to persons skilled in the art from the drawings and description set forth herein.

BRIEF DESCRIPTION OF THE DRAWINGS

FIG. 3 is a section view taken along line 3-3 of the embodiment in FIG. 1.

FIG. 3A is perspective view of one embodiment of the platform illustrating a use of the platform by a user shown in outline form.

FIG. 3B is a section view taken along line 3B-3B of the embodiment illustrated in FIG. 3A with the user's foot shown in outline form.

FIG. 5A is a perspective view of an embodiment of the invention with a lightweight foldable configuration prior to being folded up.

FIG. 5B is a perspective view of the embodiment shown in FIG. 5A illustrating a step in a process of folding up the platform.

FIG. 5C is a perspective view of the embodiment shown in FIG. 5B illustrating a further step in a process of folding up the platform.

FIG. 5D is a section view taken along line 5D-5D illustrating an embodiment of the fold line of the platform shown in FIG. 5A.

FIG. 6 is a section view taken along line 6-6 of FIG. 1.

FIG. 7 is a section view taken along line 7-7 of FIG. 1.

FIG. 8 is a perspective view of another embodiment of the platform of the invention.

FIG. 9 is a perspective view of the embodiment of the platform shown in FIG. 8 illustrating a bottom surface of the platform.

FIG. 10 is a top view showing four of the platforms shown in FIG. 8 and FIG. 9 placed in a side by side configuration.

FIG. 11 is a section view taken along line 11-11 of FIG. 8 illustrating an embodiment with a substantially rigid base.

DETAILED DESCRIPTION OF EMBODIMENTS OF THE INVENTION

Reference is made to the figures in which elements of the illustrated embodiments of the invention are given numerical designations so as to enable one skilled in the art to make and use the invention. It is understood that the following description is exemplary of embodiments of the invention and it is apparent to skilled persons that modifications are possible without departing from the inventive concepts herein described.

Figure 1:
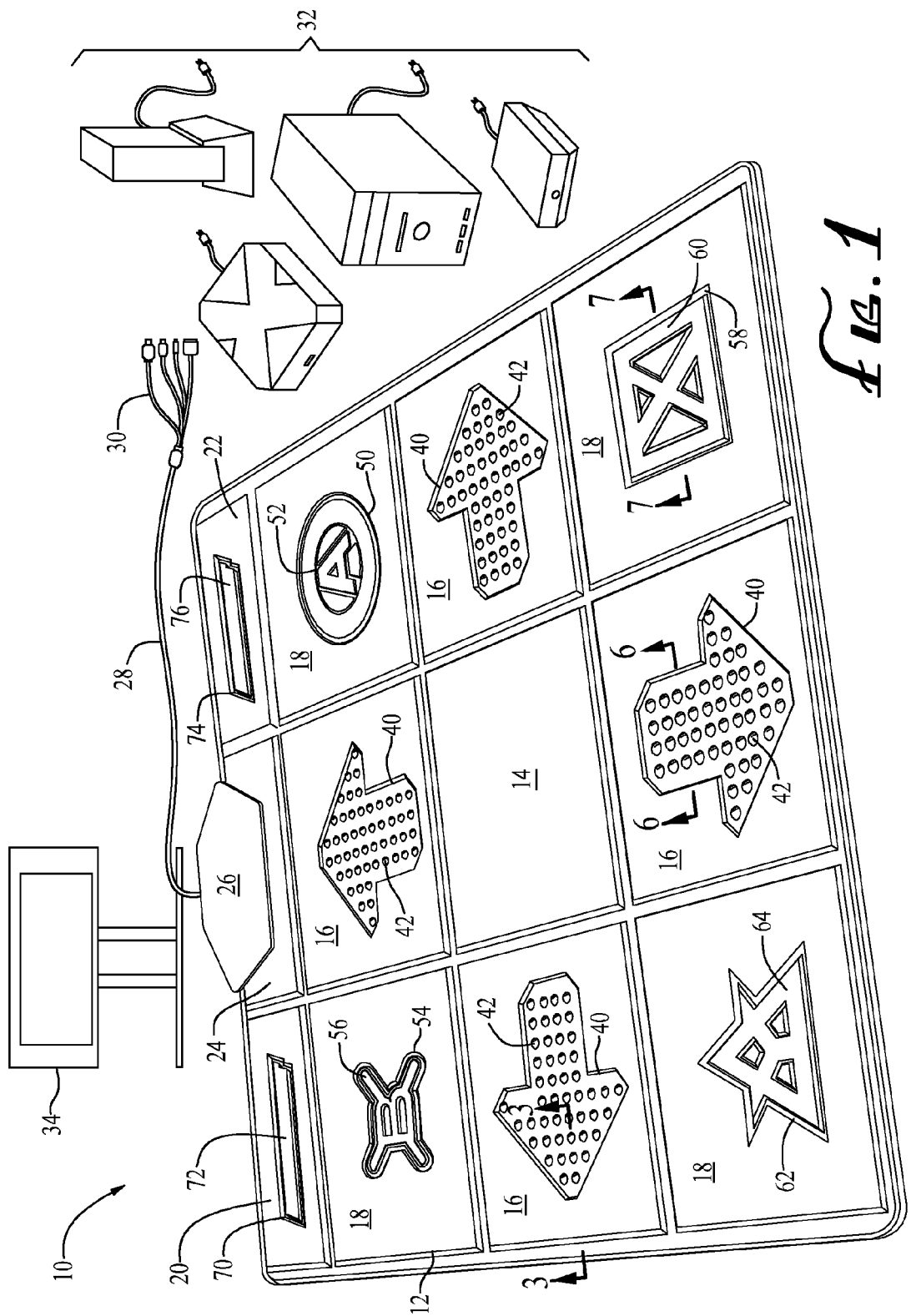
FIG. 1 is a perspective view of one embodiment of the platform of the invention.

The invention is shown in one embodiment as a platform 10 illustrated in FIG. 1 in a generally rectangular configuration. As shown in FIG. 1, the first surface 12 is partitioned into twelve separate areas with each of the twelve areas having either a rectangular or square configuration. The first surface 12 includes the center segment 14 and the four arrow segments 16 placed strategically about the center segment 14 on the first surface 12. The arrow segments 16 indicate four primary directions of foot movement by a user who is initialing standing on the center segment 14.

The first surface 12 also includes the letter segments 18 placed on areas of the first surface 12 adjacent to the arrow segments 16. The first surface 12 includes the start segment 20 and the select segment 22 with the hub segment 24 between segments 20 and 22 for securing the hub 26 to the platform 10.

The hub 26 is attached to the platform 10 in a conventional manner. In embodiments of the invention, the hub is attached to the cable 28 which has the multi-pronged connector 30 as shown in FIG. 1. The connector 30 is adapted to connect to multiple external control devices 32 for communication between the platform 10 and control device 32 as further described herein. The video display 34 is provided to display information to a user exercising or dancing on the platform 10.

Embodiments of the invention whereby a user can sense his or her foot position on the platform 10 is described herein in conjunction with the figures. The arrow segments 16 include an indentation or groove 40 formed in each arrow segment 16 therein in the shape of a directional indicator such as an arrow as shown in FIG. 1. The invention includes the use of other symbols for arrow segments 16 and all such symbols are within the scope of the invention.

A plurality of truncated domes 42 as shown in cross sectional view in FIG. 3 are formed within the groove 40. The truncated domes 42 and the groove 40 allow a user standing on the platform 12 to sense his or her foot position by the user feeling the groove 40 and the truncated domes 42.

By placing his or her foot over and onto the groove 40 and truncated domes 42, the user experiences a tactile sensation of the shape of the groove 40 and of the truncated domes 42. The user can thus feel the change in surfaces between the generally flat first surface 12 and the groove 40 and truncated domes 42 by the sense of touch. The first surface 12 and the groove 40 and truncated domes 42 thereon are formed by an injection molding process well known to persons skilled in the art.

Figure 4:
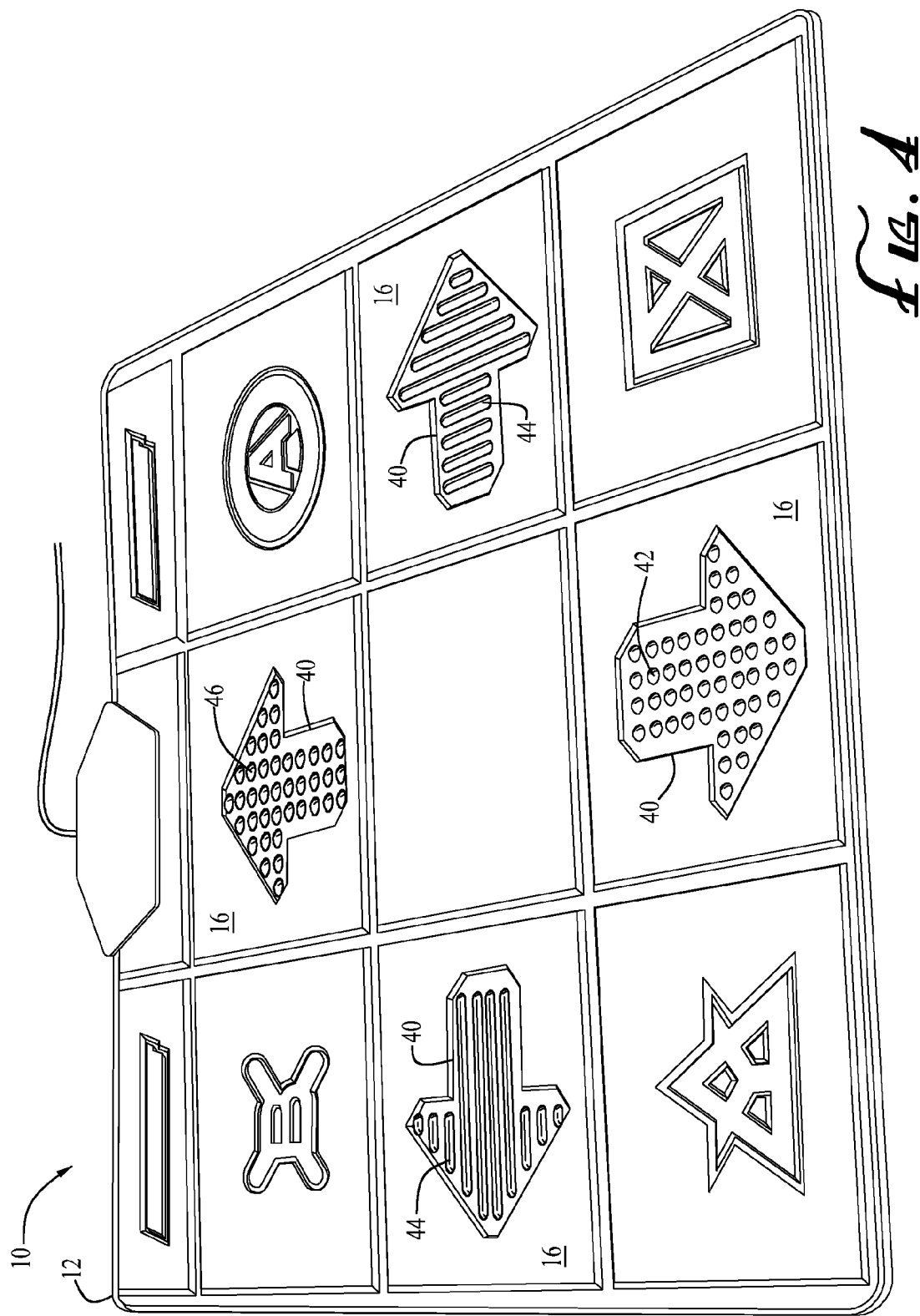
FIG. 4 is a perspective view of a further embodiment of the platform of the invention.

As shown in FIG. 4, alternative embodiments of the invention have the truncated cylinders 44 formed within the groove 40 in one or more of the arrow segments 16. The truncated cylinders 44 may have different orientations for different segments 16. The truncated cylinder 44 and the groove 40 allow a user standing on the platform 12 to sense his or her foot position by the user feeling the groove 40 and the truncated cylinder 44. The groove 40 and the truncated cylinders 44 thereon are formed by an injection molding process. As illustrated in FIG. 4, alternative embodiments of the platform 10 include the larger truncated domes 46 in one or more of the arrow segments 16.

Referring to FIG. 1, the letter segments 18 on the first surface 12 are formed with an indentation or groove therein in the shape of a distinguishing symbol and letter combination. One letter segment 18 includes the circular groove 50 and the "A O" designator 52 thereon. The second letter segment 18 includes the X-shaped groove 54 and the "B X" designator 56 thereon.

A third letter segment 18 includes the square groove 58 and the "X Square" designator 60 thereon. A fourth letter segment 18 includes the triangular groove 62 with the "Y triangle" designator 64 thereon. The invention includes the use of other symbols, numbers and letters and combinations of symbols, numbers and letters for the letter segments 16 and all such symbols, numbers, letters and combinations thereof are within the scope of the invention.

For the letter segments 18, the grooves 50, 54, 58 and 62, and complimentary designators 52, 56, 60 and 64, each allow a user standing on the platform 12 to sense his or her foot position by tactile sensation. The user feels the change in surfaces between the generally flat first surface 12 and the grooves 50, 54, 58 and 62 and the complimentary designators 52, 56, 60 and 64.

FIG. 7 shows one example of the surface of the square groove 58 and the "X Square" designator 60 that allows the user to feel the change in surfaces. The groove 50, 54, 58 and 62 and complimentary designator 52, 56, 60 and 64 are formed by the injection molding process described above for the first surface 10.

As shown in FIG. 1, the select segment 20 includes the groove 70 and the instruction designator 72 that includes an instruction imprinted thereon such as Select. The select segment 20 may include an additional symbol imprinted on the select segment 20 that also visually signals to a user the function of this segment 20 for certain applications that utilize the control device 32.

The start segment 22 includes the groove 74 and the instruction designator 76 that includes an instruction imprinted thereon such as the word Start. The start segment 22 may include an appropriate symbol imprinted on the start segment 22 that also visually signals to a user the function of this segment 22 for certain applications that utilize the control device 32.

As described above for the letter segments 18, a user standing on the platform 10 can feel his or her foot position by tactile sensation. The user moves his or her feet and feels the change in surface shape between the generally flat first surface 12 and the groove 70 or 74 and the instruction designator 72 or 76.

Figure 2:
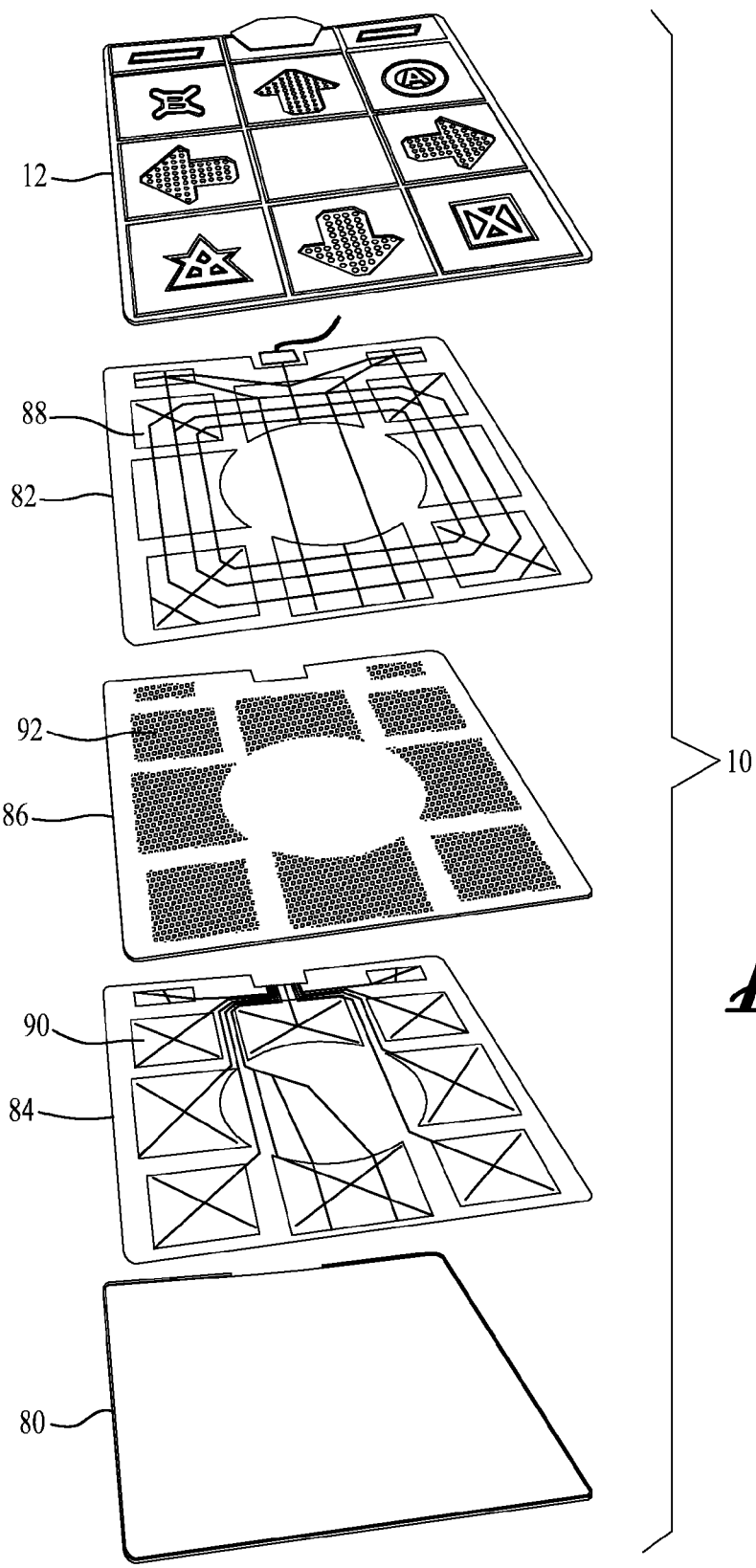
FIG. 2 is an exploded view of the platform of FIG. 1 illustrating embodiments of the construction of the invention.

FIG. 2 illustrates an exploded view of an embodiment of the platform 10. The platform is constructed in a box like configuration and includes the first surface 12 and the base 80. The base 80 has the same generally rectangular configuration as the first surface 80 so that the two can fit together to form the exterior of the platform 10. The first surface 12 is made from a non-slip material which includes ethylene vinyl acetate, also commonly known as EVA, and includes other materials known to persons skilled in the art. The base 80 is made from a non-slip material including microfiber, a woven fabric or a plastic sheet and can also be made from ethylene vinyl acetate.

The platform 10 includes the first circuit board 82 and the second circuit board 84 placed between the first surface 12 and the base 80. The first circuit board 82 and second circuit board 84 are manufactured from a nonconductive material known to persons skilled in the art.

The separator board 86 is placed between circuit board 82 and circuit board 84 as shown in FIG. 2. The separator board 86 is constructed of a nonconductive foam material that is controllably compressed when placed under a compressive force in the manner described herein and which material is known to persons skilled in the art.

The first circuit board 82 includes first conductive traces 88 constructed thereon as shown in FIG. 2. Portions of the traces 88 are positioned on the first circuit board 82 so as to lie under the segments of the first surface 12 as shown in various section views in FIG. 3, FIG. 6 and FIG. 7 when the platform 10 is assembled. The traces 88 are in communication with the hub 26 as illustrated in FIG. 2 and thus with the control device 32 via the cable 28 and the multi-pronged connector 30.

The second circuit board 84 includes second conductive traces 90 constructed thereon. Portions of the traces 90 are positioned on the second circuit board 84 so as to underlie the segments of the first surface 12 and to underlie the traces 88 of the first circuit board 82 when the platform 10 is assembled as shown in FIG. 3, FIG. 6 and FIG. 7. The traces 90 are in communication with the hub 26 as illustrated in FIG. 2 for communication with the control device 32 by the cable 28 and the multi-pronged connector 30 attached to the hub 26.

The platform 10 is arranged into an assembled configuration by the stitching connector 96 applied at and around the periphery of the platform 10 as shown in FIG. 3. The stitching connector 96 secures together the first surface 12, the first circuit board 82, the separator board 86 and the second circuit board 84 into the assembled configuration.

The platform 10 includes a plurality of switches 94 under each of the segments. The switches, designated generally as 94, are normally in the open position as shown in FIG. 3, FIG. 6 and FIG. 7 as a result of the spacing created by the separator board 86 between the first circuit board 82 and the second circuit board 84.

In the assembled configuration, the first conductive traces 88 and the second conductive trace 90 face each other separated by the separator board 86. The separator board 86 includes a plurality of apertures 92 that are positioned on the board 86 so as to lie under the segments of the first surface 12 as shown in FIG. 2 and in section view in FIG. 3, FIG. 6 and FIG. 7.

Referring to FIG. 3A, one or more of the switches 94 is closed when a force is applied to the particular segment by, for example, placement of a user's foot onto the segment. As illustrated in FIG. 3B, the force compresses the portion of the separation board 86 under that segment and the trace 88 contacts the trace 90 through the aperture 92 and a signal is communicated to the hub 26 and to the control device 32 by the cable 28 and connector 30.

The force from the user's foot placement need not be normal to the first surface 12 or require great exertion by the user to close a switch 94 or more than one of the switches 94. To communicate that the segment has been stepped on by the user generally requires one of the switches 94 to be closed from the force of the user's step.

Referring to FIGS. 5A-5D, embodiments of the invention include a convenient fold-up feature. In FIG. 5A, the platform 10 is divided into multiple rows of segments and includes a left row 100, a center row 102 and a right row 104. The left row 100 and the center row 102 are separated by a left fold line 106. The right row 104 and the center row 102 are separated by a right fold line 108. The left fold line 106 is shown in section view in FIG. 5D.

To fold the platform 10, the left row 100 is folded along the left fold line 106 in the manner illustrated by the arrow labeled #1 in FIG. 5A and placed under and adjacent to the center row 102. The right row 104 is folded along the right fold line 108 in the manner illustrated by the arrow #2 in FIG. 5B and placed adjacent to the left row 100 as shown in FIG. 5C in the folded up configuration 110 of the platform 10. As can be appreciated by dance and exercise enthusiasts, the platform 10 in the folded up configuration 110 can be placed in a storage area so that the floor space once taken up by the platform 10 can be used for other activities.

Referring to FIGS. 8-9, embodiments of the invention include a connecting structure to connect one platform 10 to another platform 10 as discussed herein. One type of connecting structure shown is a hook and loop fastener having two parts. One part of the hook and loop fastener, shown as loop section 120 in FIG. 8, is secured to one side of the platform 10. The second part of the hook and loop fastener, shown as hook section 122 in FIG. 9, is secured to the base 124 of the platform 10.

FIG. 11 illustrates an alternative embodiment of the platform with a modified base 124. The modified base 124 has an increased thickness to provide additional rigidity during use of the platform 10. A stitching connector 126 is applied at and around the periphery of the platform 10 to secure the component parts together as shown in FIG. 11.

A first platform 10 is connected to a second platform 10 by connecting the loop section 120 of the first platform 10 to the hook section 122 on the second platform 10. A series of platforms 10 connected in a side by side configuration are shown for illustrative purposes in FIG. 10. The exemplary arrangement in FIG. 10 can be used by multiple users each with their own platform 10 but with the users all watching the same video display 34 or each watching different video displays 34.

While the invention has been described with regards to particular embodiments, it is recognized that additional variations of the invention may be devised and utilized without departing from the inventive concepts described herein.

What is claimed is:

1. An apparatus for an exercise and dance mat and platform comprising:

a first surface, having a plurality of segments and segment specific tactile indicia molded thereon and constructed to support the weight of an individual thereon, the segment specific tactile indicia configured so that the segments are distinguishable by touching the tactile indicia;

a first circuit board having first conductive traces adjacent to the first surface;

a second circuit board with second conductive traces, adjacent to the first circuit board and having a nonconductive separator board therebetween; and the first conductive traces and the second conductive traces arranged under the first surface to form a series of segment specific switches so that in operation when a segment is stepped on by an individual, the conductive traces form a closed switch and transmit signals for processing by a controller indicating which of said segment is being stepped on and stops transmitting the signals when the segment is no longer being stepped on.

2. The apparatus of claim 1 wherein the first surface, the first surface segments and the tactile indicia thereon comprise a single piece of material formed by injection molding.

3. The apparatus of claim 2 wherein the material is ethylene vinyl acetate.

4. The apparatus of claim 1 where the tactile indicia include a plurality of truncated domes or truncated cylinders.

5. The apparatus of claim 1 where the tactile indicia include letters, symbols or a combination of letters and symbols.

6. The apparatus of claim 1 further where the first surface comprises non-slip material.

7. The apparatus of claim 1 where the controller comprises a computer.

8. The apparatus of claim 1 further comprising a first fold line and a second fold line configured onto the first surface so that segments of the first surface are adapted to be folded over other segments of the first surface.

9. The apparatus of claim 1 further comprising two or more apparatus connected together in a side by side configuration.

10. An apparatus for exercising and dancing comprising:

a platform having a first surface and a base;

the first surface including a plurality of segments molded thereon, one or more of the segments comprising tactile indicia molded onto the first surface, the segments and the tactile indicia constructed so that an individual stepping onto the first surface can substantially determine by foot contact with the first surface which segment or segments the individual's foot is contacting; and a plurality of sensors between the first surface and the base, the sensors being in communication with a hub, each segment of the first surface having at least one sensor adjacent to the segment and responsive to the pressure applied to the segment, so that in operation when a segment on the first surface is stepped on by an individual, the at least one sensor transmits signals to the hub indicating said segment is being stepped on and stops transmitting the signals to the hub when the segment is no longer being stepped on.

11. The apparatus of claim 10 where the first surface and the base comprise non-slip material.

12. The apparatus of claim 10 wherein the sensors are electrically conductive switches comprising a first circuit board with first conductive traces and a second circuit board with second conductive traces, the first circuit board and the second circuit board having a nonconductive separator sheet therebetween.

13. The apparatus of claim 10 where the first surface is made by injection molding.

* * * * *